United States Patent
Mentele

(10) Patent No.: US 10,523,014 B2
(45) Date of Patent: Dec. 31, 2019

(54) CONTROL OF A MULTIPLE INPUT SOLAR POWER INVERTER

(71) Applicant: DET International Holding Limited, George Town, Grand Cayman (KY)

(72) Inventor: Michael Mentele, Teningen (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 118 days.

(21) Appl. No.: 15/843,648

(22) Filed: Dec. 15, 2017

(65) Prior Publication Data
US 2018/0175625 A1   Jun. 21, 2018

(30) Foreign Application Priority Data
Dec. 15, 2016   (EP) .................................... 16204403

(51) Int. Cl.
*H02J 3/38* (2006.01)
*H02S 40/32* (2014.01)

(52) U.S. Cl.
CPC .............. *H02J 3/385* (2013.01); *H02S 40/32* (2014.12)

(58) Field of Classification Search
CPC ......... H02J 3/385; H02S 40/32; H02M 3/156; Y02E 10/58
See application file for complete search history.

(56) References Cited

U.S. PATENT DOCUMENTS

| | | |
|---|---|---|
| 8,093,756 B2 | 1/2012 | Porter et al. |
| 8,242,634 B2 | 8/2012 | Schatz et al. |
| 2009/0236917 A1 | 9/2009 | Bettenwort et al. |
| 2014/0327313 A1* | 11/2014 | Arditi ............... H01L 31/02021 307/63 |
| 2015/0078049 A1 | 3/2015 | Yoo et al. |
| 2015/0085542 A1 | 3/2015 | Li |
| 2015/0340869 A1 | 11/2015 | Unru et al. |
| 2016/0172861 A1* | 6/2016 | Baba ........................ G05F 1/67 307/78 |

FOREIGN PATENT DOCUMENTS

EP   3 026 521 A1   6/2016

OTHER PUBLICATIONS

Communication Pursuant to Article 94(3) EPC dated Jul. 8, 2019 in corresponding European Application No. 16204403.6.

* cited by examiner

*Primary Examiner* — Carlos Amaya
(74) *Attorney, Agent, or Firm* — Birch, Stewart, Kolasch & Birch, LLP

(57) ABSTRACT

A solar power inverter includes a number of photovoltaic (PV) inputs for connecting PV modules, a DC-DC converter at each of the PV inputs and a DC-AC inverter for converting the outputs of the DC-DC converters to an AC output power that may be fed into a power grid. The invention provides a method of controlling such a solar power inverter including the steps of identifying a PV input by assigning a priority value to the PV inputs and identifying the PV input with the highest assigned priority value, calculating a set value for the DC-DC converter at the identified PV input that is equal or below a maximum power capacity of the PV module connected to the identified PV input, and applying the set value for the DC-DC converter at the identified PV input.

16 Claims, 3 Drawing Sheets

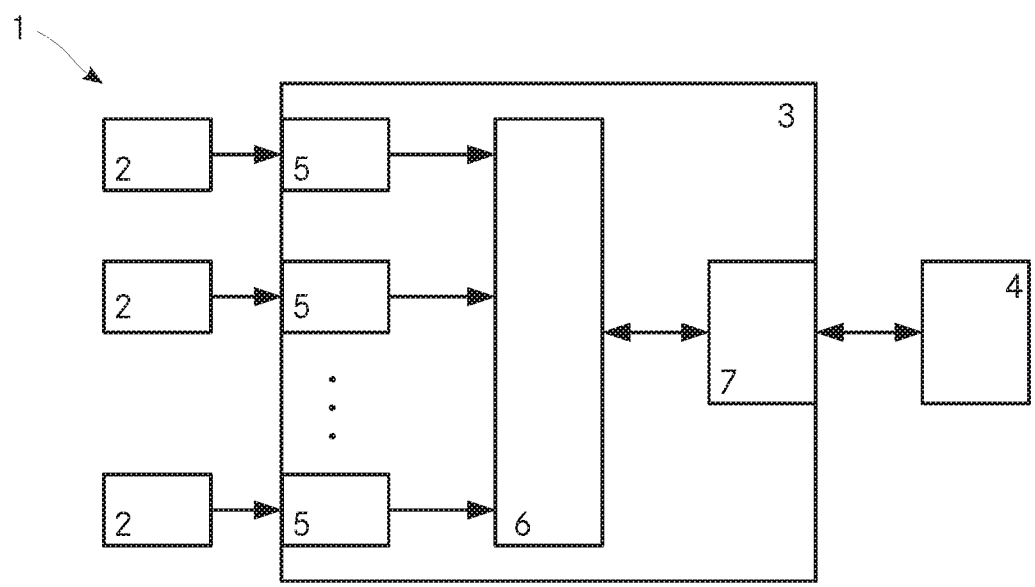
Fig. 1 - CONVENTIONAL ART
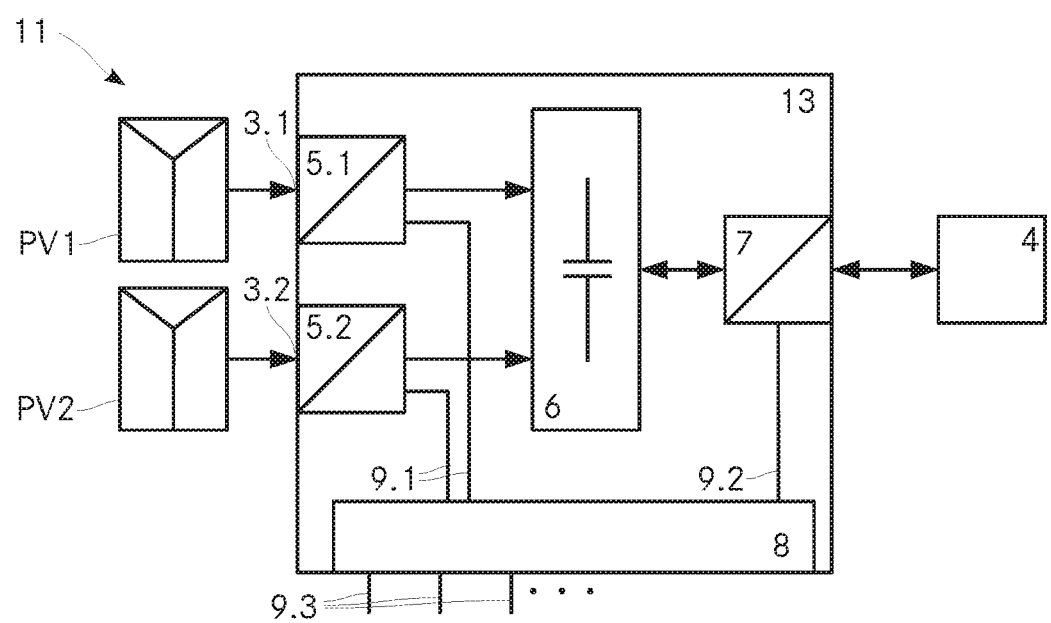
Fig. 2

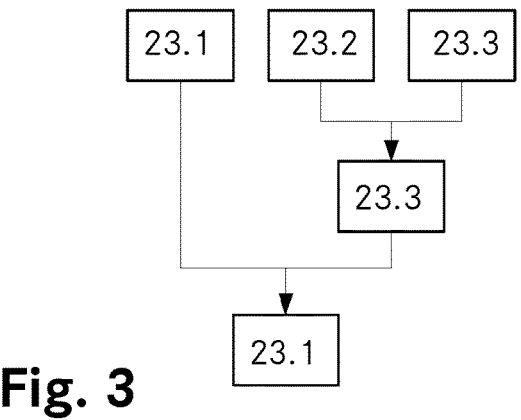
Fig. 3
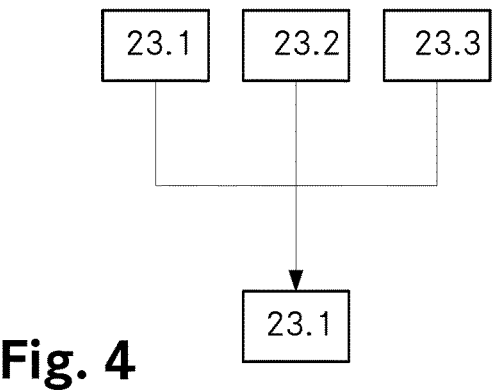
Fig. 4
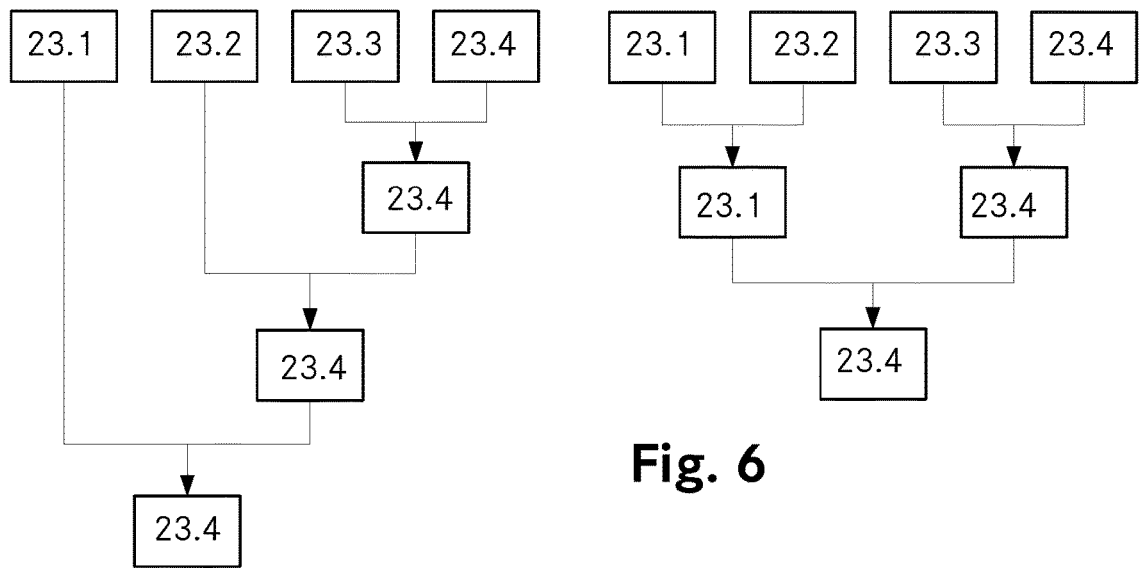
Fig. 5
Fig. 6
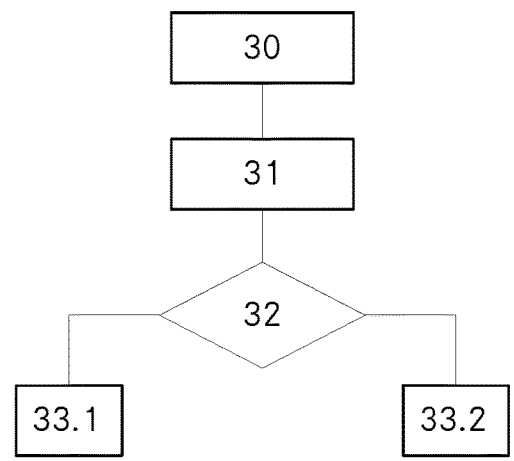
Fig. 7

CONTROL OF A MULTIPLE INPUT SOLAR POWER INVERTER

TECHNICAL FIELD

The invention relates to a method of controlling a solar power inverter having two or more PV (photovoltaic) inputs for connecting photovoltaic modules, a DC-DC converter at each of the photovoltaic inputs and a DC-AC inverter for converting the outputs of the DC-DC converters to an AC output power to be outputted at an output of the solar power inverter, the method including the steps of calculating and applying a set value for an input power of the DC-DC converter at one of the photovoltaic inputs. The invention further relates to a corresponding solar power inverter.

BACKGROUND ART

Solar power inverters are used to convert the DC power delivered by one or more PV cells (or solar cells) into an AC output power. The AC power may be coupled to a load, fed to an energy storage such as a battery or the like or it may be fed to a power grid. One known type of solar power inverter may include a plurality of PV inputs and a DC-DC converter at each of the PV inputs. The resulting DC power is then fed to a DC-AC inverter that provides the AC output power.

Multiple PV cells may be re-connected in parallel or series and arranged to form a solar module. A number of modules then may be connected to form a string and multiple strings are arranged to form a PV array.

The power delivered by a PV cell may vary over time due for example to variations in operating conditions such as changes in sunlight intensity, angle of incidence of sunlight, ambient temperature and other factors. PV cells accordingly are usually operated at an operating point at which the current and voltage values result in a power output as high as possible. This so called maximum power point (MPP) is a function of different, mostly environmental variables including light intensity and temperature. Power inverters for PV systems therefore often include some form of maximum power point tracking (MPPT) as a mechanism of identifying and tracking the MPP and controlling the power inverter to exploit the maximum possible power capacity of each PV cell.

US 2015/0085542 A1 from Delta Electronics Inc. discloses a photovoltaic module and a corresponding micro inverter of a solar power system. Based on the output power of the photovoltaic module it is decided whether or not the micro inverter enters a power boosting mode wherein the micro inverter delivers its maximum output power that is higher than its rated output power.

U.S. Pat. No. 8,093,756 B2 from AMPT LLC discloses control of an AC power system for renewable electrical energy such as to enhance the system efficiency. The DC power delivered by for example photovoltaic modules is converted in a first stage by a plurality of DC-DC converters. In a second stage, the converted DC power is converted to an AC power by a DC-AC inverter. In one aspect the output of the DC-DC converters is controlled by the DC-AC inverter for example by means of a direct control input. In this way, the system may be controlled such that that the DC-AC inverter has a high efficiency thereby independently controlling the DC-DC converters to maintain MPPT (Maximum Power Point Tracking).

Document U.S. Pat. No. 8,242,634 B2 discloses a solar energy system allowing an individualised control and analysis for overall field power control. The solar energy system includes a plurality of power sources each feeding into a dedicated DC-DC converter. The DC output of the DC-DC converters are fed to a DC-AC inverter providing an AC output connectable for example to a power grid. Different aspects are discloses such as power management with switch disconnect control, sequenced start of a solar power system or programmable power functionality control.

Despite the known MPP tracking the prior art does not reach the desired level of efficiency and the measures to be taken are typically rather complicated.

SUMMARY OF THE INVENTION

It is the object of the invention to create a method of controlling a solar power inverter pertaining to the technical field initially mentioned, that is simple and enables a very efficient usage of the power provided by the PV cells connected to the solar power inverter.

The solution of the invention is specified by the features of claim 1. The invention deals with a method of controlling a solar power inverter having two or more photovoltaic inputs for connecting photovoltaic modules, a DC-DC converter at each of the photovoltaic inputs and a DC-AC inverter for converting the outputs of the DC-DC converters to an AC output power to be outputted at an output of the solar power inverter, the method including the steps of calculating and applying a set value for an input power of the DC-DC converter at one of the photovoltaic inputs. According to the invention, the method further includes the steps of identifying a photovoltaic input by assigning a priority value to at least a part of the photovoltaic inputs and identifying the photovoltaic input with the highest assigned priority value, calculating the set value for the DC-DC converter at the identified photovoltaic input to be equal or below a maximum power capacity of the photovoltaic module connected to the identified photovoltaic input and applying the set value to the DC-DC converter at the identified photovoltaic input.

Typically, and as is the case in connection with this invention, the maximum PV input power $P_{PVx}$ at each of the PV inputs is smaller than the total PV input power $P_{PVtot}$ of the solar power inverter. But the sum of the PV input powers $P_{PVx}$ at the PV inputs is bigger than the total PV input power $P_{PVtot}$ of the solar power inverter. Accordingly, the PV input power $P_{PVx}$ at each of the PV inputs has to be limited to the maximum PV input power $P_{PVxmax}$ at the corresponding PV input. And the sum of the PV input power $P_{PVx}$ at all PV inputs has to be limited to the maximum total input power $P_{PVmax}$ of the solar power inverter.

In a normal mode of operation, the solar power inverter is operated at the MPP. However, in certain situations the efficiency of the solar power inverter can be further enhanced by slightly limiting the input power at one or more of the PV inputs. If for example the voltage at one of the PV inputs is low, then the voltage at that PV input can be raised by a power input limitation at that PV input.

As the DC voltage provided by the PV modules connected to the PV inputs usually is lower than the DC voltage required at the input of the DC-AC inverter, the DC-DC converters at the PV inputs are preferably boost converters.

Although it is generally possible to determine the set value for the input power of the identified PV input to be higher than the maximum output power of the PV module connected to that PV input, the set value is preferably calculated to be equal or below the maximum output power of that PV module.

Since it is a general goal to operate each of the DC-DC converters at the maximum possible input power, calculating a set value below the maximum PV module output power means a limitation of the PV modules output power.

Accordingly, in order to enhance the efficiency of the solar power inverter, the output power of one or more PV modules connected to the PV inputs of the solar power inverter is limited. This is done by first identifying one or more PV inputs at which the input power has to be limited and then actually limiting the input power at the one or more PV inputs by calculating a corresponding set value for the input power of the DC-DC converters at the identified PV inputs.

The identification of the one or more PV inputs to be limited is done by assigning a priority value to at least one of the PV inputs using a suitable criterion and then limiting the input power at the PV input with the highest priority value or the PV inputs with the highest priority values.

The kind or type of the criterion to prioritise the PV inputs can in general be chosen rather arbitrarily. For example the order of installation of the PV modules connected to the PV inputs can be used as criterion to prioritise the PV inputs. Or the age of a component in connection with a PV input such as for example the fabrication date of the DC-DC converter or the PV module connected to the PV input can be used for prioritisation of the PV inputs.

However, using a criterion that is representative of a characteristic of the PV module connected to a particular PV input, such as for example the age, the run-time, the temperature, the output voltage, the output current or any other characteristic of the PV modules, is advantageous since this allows an even usage of the PV modules over time and/or it allows to react to the current circumstances of the system in a fast and efficient way.

According to an advantageous embodiment of the invention, the step of assigning a priority value to at least a part of the PV inputs includes the step of obtaining a module value representative of a characteristic of the respective PV module connected to said PV inputs. And then a priority value for said PV inputs is determined under consideration of the obtained module values. A module value in this case simply designates a value as mentioned above such as the age, the run-time, the temperature, the output voltage, the output current or any other characteristic of the PV modules connected to the PV inputs.

The term at least a part of the PV inputs in this connection means that a priority value is assigned to at least some but not necessarily all of the PV inputs. However, a priority value is usually assigned to all of the PV inputs.

Further, the term assigning a priority value to a PV module is sometimes used in the following instead of assigning a priority value to a PV input to which the PV module is connected.

The assignment of a priority value to a PV input or a PV module respectively is done by a control device which for example includes a microprocessor or the like. The control device preferably is part of the solar power inverter but may also be external to the power inverter. The control device may also be a dedicated controller just for the purpose of assigning a priority value or the function of assigning priority values may be executed by a controller which also fulfils other functions within or outside the solar power inverter.

So, in a preferred embodiment of the invention, the output voltage of the PV module connected to a PV input is used as the module value, which means that the output voltage of the PV modules is measured and a priority value is assigned to the PV modules such that a PV module having a lower output voltage is assigned a higher priority value than a PV module having a higher output voltage. Or in other words: The PV input with the lowest PV voltage is limited. In this way, the input voltage at that PV input is increased at limitation and thus the efficiency is increased.

In another preferred embodiment of the invention, the temperature of the PV inputs is used as the module value. The temperature of the PV input i.a. depends on the current or power transferred from the PV module to the DC-DC converter through the PV input. This means that the PV input temperature is also representative of a PV module characteristic. Accordingly, the temperature of the PV inputs is measured and a priority value is assigned to each PV input such that a PV input having a higher temperature is assigned a higher priority value than a PV input having a lower temperature. Limiting the power at the PV input with the highest temperature will lower its temperature and therefore reduce the losses at this PV input.

In a further preferred embodiment of the invention, the run-time of a PV module is used as the module value. Accordingly, the run-time of the PV module is acquired, for example by readout of a corresponding logging table within the PV module, the DC-DC converter or the solar power inverter wherein the run-times are logged, and a priority value is assigned to each PV module such that a PV module having a higher run-time is assigned a higher priority value than a PV module having a lower run-time. Using this criterion ensures an averaged power run-time behavior of the PV modules.

A single set point calculation and application would be generally be possible, this would however not reflect any changes in the system which means that the systems efficiency would be rather low. In order to monitor the PV system over time and be able to react to any changes, the set value in another preferred embodiment of the invention is calculated and applied repeatedly.

The method can for example be carried out in dependency of any changes such that the set value is calculated an applied every first, second, third of n-th time a change in the PV system has been detected. Such a change could for example be a change in the output current of a PV module, a change in the weather conditions or any other measurable or detectable system change. However, preferably, the set method is carried out in regular time intervals where the time interval is between 5 seconds and 10 minutes. More preferably, the time interval is between 10 seconds and 5 minutes. And most preferred the time interval is between 30 seconds and 2 minutes.

A set value may either be calculated and applied to only one, two or more or even all of the DC-DC converters to which PV modules are connected. In case a set value shall be calculated and applied to two or more DC-DC converters, this can generally be done in any arbitrary order.

But in a preferred embodiment of the invention, where two or more PV inputs are identified and a set value is calculated and applied for the two or more DC-DC converters connected to the identified PV inputs, these set values are calculated and applied to the DC-DC converters in the order of the priority values assigned to the respective PV inputs.

In a normal mode of operation of the PV system, the set values for the DC-DC converters are calculated such that the DC-AC inverter is not overloaded. Accordingly, the set value for the input power of all DC-DC converters are set such that a sum of these input powers is equal to or below a maximum output power of the solar power inverter.

But in a further preferred embodiment of the invention, the load of the DC-AC inverter i. e. the sum of the input powers of all PV inputs, is allowed to slightly exceed DC-AC inverters maximum output power when the priority to limit the power of a DC-DC converter has changed from one DC-DC converter to another DC-DC converter. Or in other words, during a transition from one identified PV input to another identified PV input, a power of the solar power inverter may exceed a maximum output power of the solar power inverter.

Exceeding is advantageous to ensure that always maximum power can be drawn from the PV modules and that the PV module with the maximum power becomes available. This arises from the fact that if a PV input is increased is not clear if the required power actually ca be supplied by the respective PV module.

How much the maximum output power may be exceeded depends on how often the priorities change. The more often the priorities change, the less the maximum output power should be exceeded. And the rarer the priorities change, the more may the maximum output power be exceeded.

Actual exceeding however only happens if all PV modules connected to the solar power inverter provide exactly or almost their maximum power. This is unlikely to happen anyway. But if it happens, it happens only for a short time and the maximum power is usually exceeded only for a small amount anyway.

Accordingly, the power of the solar power inverter is allowed to exceed its maximum output power only by a small amount. Preferably, the power of the solar power inverter may exceed the maximum output power of the solar power inverter just by a defined percentage of the maximum output power, where this defined percentage is less than 3%. Preferably, this percentage is however 1% or less.

Now, in case the input power of one or more DC-DC converters has been limited, the allowed input power should be increased again such that the PV systems overall efficiency can be made as high as possible. Therefore, in another preferred embodiment of the invention, the input power of at least one of the PV inputs is increased to the maximum PV input power of the respective PV module. This is preferably done in regular steps such as for example in steps of 1% of the maximum PV input power of the respective PV module.

Generally spoken, after a change from one PV input to another PV input, the set value for the PV input power $P_{PVN}[n]$ of a particular PV input with number N at a particular step with number n is increased in steps of p % of the maximum input power $P_{PVNmax}$ of the Nth PV input based on the set value $P_{PVN[n-1]}$ of that PV input number N at the previous step n−1 according to the formula $$P_{PVN}[n]=\text{MIN}\{P_{PVNmax}, P_{PVN}[n-1](P_{PVNmax}*1\%)\}.$$

Then, the input power limitation at an identified PV input with number N is done on the basis of the last measured power values of the remaining PV inputs and the previously calculated maximum PV input power of the solar power inverter according to the formula $$P_{PVN}[n]=\text{MIN}\{P_{PVN}[n], P_{max}-\text{SUM}(P_{PVXin})\}$$

where $P_{max}$ is the maximum PV input power of the solar power inverter and $\text{SUM}(P_{PVXin})$ is the sum of the measured PV input powers of all PV modules connected to the remaining PV inputs.

As outlined above, the prioritisation of the PV inputs is preferably done on the basis of a module value which is a value that is representative of a particular characteristic of the PV module connected to a PV input. Now, if the module values are determined for each or at least a part of the PV inputs, there are many different prioritisation schemes or priority mapping structures possible for allocating priorities to the PV inputs. In a preferred embodiment of the invention the priority values are assigned to the PV inputs in one or more stages such that in each stage the priority values of two PV inputs are compared and the PV input with the higher priority is chosen to be the identified PV input or—if further non-compared PV inputs are left—advances to the next stage to be compared with one of the non-compared PV inputs.

Instead of just limiting one or more PV inputs as described above, it is generally also possible to limit all PV inputs at once, either by a given amount of power or by a certain percentage of the currently available power or the maximum possible power of each PV module.

The solution of the invention regarding the solar power inverter is specified as follows. According to the invention, the solar power inverter further includes a control device for calculating and applying a set value for an input power of the DC-DC converter at one of the photovoltaic inputs, wherein the control device is adapted to Identify a photovoltaic input by assigning a priority value to at least a part of the photovoltaic inputs and identifying the photovoltaic input with the highest assigned priority value, calculate the set value for the DC-DC converter at the identified photovoltaic input to be equal or below a maximum power capacity of a photovoltaic module connected to the identified photovoltaic input and applying the set value to the DC-DC converter at the identified photovoltaic input.

Other advantageous embodiments and combinations of features come out from the detailed description below and the totality of the claims.

BRIEF DESCRIPTION OF THE DRAWINGS

The drawings used to explain the embodiments show:

FIG. 1 a schematic diagram of a general PV system according to the prior art,

FIG. 2 a schematic diagram of a particular PV system according to the invention, FIG. 3 a schematic diagram of a first type of prioritisation of the PV inputs, FIG. 4 a schematic diagram of a second type of prioritisation of the PV inputs, FIG. 5 a schematic diagram of a third type of prioritisation of the PV inputs, FIG. 6 a schematic diagram of a fourth type of prioritisation of the PV inputs, FIG. 7 a flow diagram of the power limitation in a PV system with two PV modules, FIG. 8 a diagram showing the power output of two unlimited PV modules, FIG. 9 a diagram showing the set value development for the two PV modules shown in FIG. 8 and FIG. 10 a diagram showing the resulting power output of the two PV modules shown in FIG. 8 as limited with the set value development shown in FIG. 9.

In the figures, the same components are given the same reference symbols.

PREFERRED EMBODIMENTS

Figure 8:
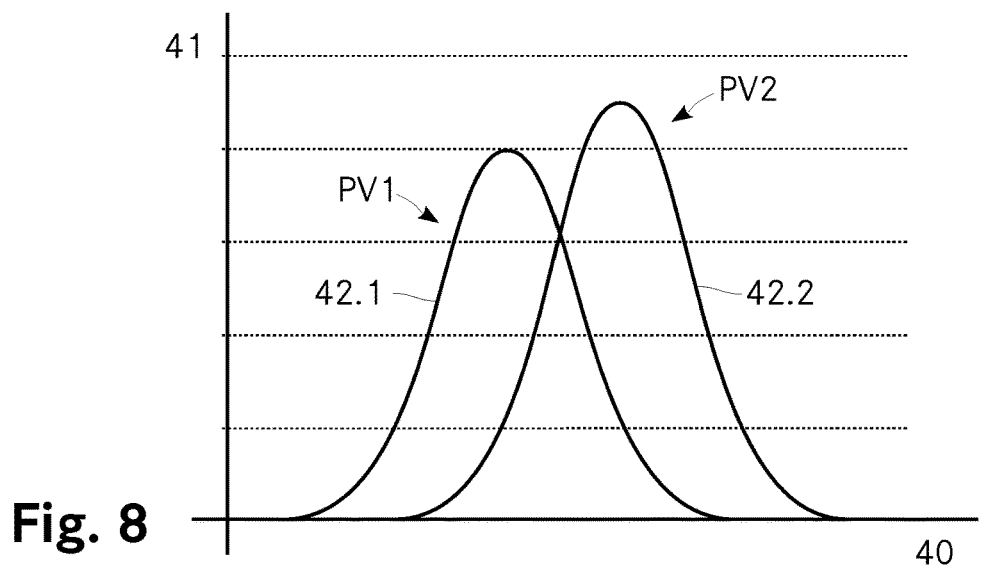

FIG. 1 shows a schematic diagram of a general prior art PV system 1. The PV system 1 includes a plurality of PV modules 2 connected to a solar power inverter 3 which itself is connected to a power grid 4. The solar power inverter 3 includes a plurality of DC-DC converters 5 to which the PV modules 2 are connected. The DC-DC converters are boost converters which provide a higher level voltage to the input of a DC-AC inverter 7 via a set of bulk capacitors 6. The output of the DC-AC inverter 7 is connected to the power grid 4 to feed the power provided by the PV modules 2 and inverted by the solar power inverter into the power grid 4 for transmission and use at other places.

FIG. 2 shows a schematic diagram of a particular PV system 11 according to the invention. The PV system 11 includes a solar power inverter 13 having two PV inputs 3.1, 3.2 with two DC-DC converters 5.1, 5.2 to which two PV modules PV1, PV2 are connected. The outputs of the DC-DC converters 5.1, 5.2 are connected to a DC-AC inverter 7 via a set of bulk capacitors 6. The output of the solar power inverter 13, i. e. the output of the DC-AC inverter 7 is again connected to the power grid 4. The solar power inverter 13 further includes a controller 8 that calculates the set values for the input power of the DC-DC converters 5.1, 5.2 as described below and that provides the calculated set values to the DC-DC converters 5.1, 5. via control lines 9.1. The controller 8 is further connected to the DC-AC inverter 7 via control line 9.2 to optionally also control the functioning of the DC-AC inverter 7. The controller 8 further is connected to other devices, sensors or the like via a corresponding number of control lines 9.3 to receive or provide data or sensor signals such as for example temperature data or signals from the PV inputs 3.1, 3.2, voltage data or data or signals from the outputs of the PV modules PV1, PV2. All or a part of these data or signals may also be provided to the controller 8 via the control lines 9.1 or 9.2.

Based on the data or signals provided to the controller 8, the controller 8 calculates the set values for the DC-DC converters 5.1, 5.2.

As outlined above, when calculating an applying the set values to the DC-DC converters 5.1, 5.2, the PV inputs are prioritised. This is done by determining a module value which in this case is the output power of the PV modules. These output powers are either measured all before the prioritisation starts or they are measured as they are needed during the process of prioritisation.

FIG. 3 shows a schematic diagram of a first type of prioritisation of the PV inputs. In the example shown three PV inputs 23.1, 23.2, 23.3 are to be prioritised where the output powers of the PV modules connected to the PV inputs 23.1, 23.2, 23.3 are measured as follows output power of PV module connected to PV input 23.1 4000 Watt output power of PV module connected to PV input 23.2 3000 Watt output power of PV module connected to PV input 23.3 3500 Watt In a first stage the measured output power of the PV inputs 23.2, 23.3 is compared and, since the output power at PV input 23.3 is higher than the output power at PV input 23.2, the PV input 23.2 is assigned the least priority which in this case is 3. PV input 23.3 therefore advances to the next stage in which it is compared with the PV input 23.1. Since the output power at PV input 23.1 is higher than the output power at PV input 23.3, the PV input 23:3 is assigned the next priority which in this case is 2. And PV input 23.1 advances to the next stage which in this case is the last stage. This means that PV input 23.1 is assigned the highest priority 1.

Accordingly, input power limitation is done in the order of priorities, which is: PV input 23.1, PV input 23.3 and finally PV input 23.2.

FIG. 4 shows a schematic diagram of a second type of prioritisation of the PV inputs 23.1, 23.2, 23.3. The measured output powers of the PV modules connected to these PV inputs 23.1, 23.2, 23.3 is the same as given in connection with FIG. 3. In this case, the comparison of the output powers is not done in stages, but directly for all three PV inputs 23.1, 23.2, 23.3 at once. Since the highest output power is measured at PV input 23.1, this input is assigned the highest priority whereas the other PV inputs 23.2, 23.3 are assigned the same but a lower priority.

FIG. 5 shows a schematic diagram of a third type of prioritisation of the PV inputs where in this case four PV inputs 23.1, 23.2, 23.3, 23.4 are present. The measured output powers of the PV modules connected to the PV inputs 23.1, 23.2, 23.3 are the same as given in connection with FIG. 3 and the measured output powers of the PV module connected to the PV inputs 23.4 is as follows:

output power of PV module connected to PV input 23.4 4500 Watt

The prioritisation scheme is similar to the one shown in FIG. 3. In a first stage the measured output power of the PV inputs 23.3, 23.4 is compared and, since the output power at PV input 23.4 is higher than the output power at PV input 23.3, the PV input 23.3 is assigned the least priority which in this case is 4. PV input 23.4 therefore advances to the next stage in which it is compared with the PV input 23.2. Since the output power at PV input 23.4 is higher than the output power at PV input 23.2, the PV input 23.2 is assigned the next priority which in this case is 3. And PV input 23.4 advances to the next stage in which it is compared with the PV input 23.1. Since the output power at PV input 23.4 is higher than the output power at PV input 23.1, the PV input 23.1 is assigned the next priority which in this case is 2. And PV input 23.4 advances to the next stage which in this case is the last stage. This means that PV input 23.4 is assigned the highest priority 1.

FIG. 6 shows a schematic diagram of a fourth type of prioritisation of the four PV inputs 23.1, 23.2, 23.3, 23.4. The measured output power values are the same as in the example described in connection with FIG. 5. Contrary to the prioritisation scheme shown in FIG. 5, the prioritisation scheme here just includes three stages. This is because in the first stage, the PV inputs 23.1 and 23.2 are compared as well as the PV inputs 23.3 and 23.4. Since the output power at PV input 23.1 is higher than the output power at PV input 23.2, the PV input 23.2 is assigned the least priority which in this case is 3. And PV input 23.1 advances to the next stage. Since the output power at PV input 23.4 is higher than the output power at PV input 23.3, the PV input 23.3 also is assigned the least priority 3. Therefore, PV input 23.4 advances to the next stage in which it is compared with the PV input 23.1. Since the output power at PV input 23.4 is higher than the output power at PV input 23.1, the PV input 23.1 is assigned the next priority which in this case is 2. And PV input 23.4 advances to the next stage which in this case is the last stage. This means that PV input 23.4 is assigned the highest priority 1.

Now referring back to FIG. 2 showing the PV system 1 with two PV modules PV1, PV2. In this example, the maximum PV power $P_{PV1max}$ allowed at PV input 3.1 is 4500 Watt and the maximum PV power $P_{PV2max}$ allowed at PV input 3.2 is 4500 Watt as well. The maximum total power $P_{max}$ of the solar power inverter, i. e. the DC-AC inverter 7 is 6000 Watt.

In order to decide of which DC-DC converter 5.1, 5.2 the input power is to be limited, the PV voltage at the output of the PV modules PV1, PV2 is measured. The process of power limitation in the PV system 1 is shown in the flow diagram of FIG. 7. This process is repeated every minute to adapt the power limitation to the current conditions of the PV system 1.

The process of PV power limitation 30 starts with the step of maximum power limitation 31 of the PV modules PV1 and PV2. In the step PV input selection 32 the PV input to be limited is selected based on the measured PV output power of the PV modules PV1, PV2. And finally, in the steps PV limitation 33.1, 33.2, the selected PV input is actually limited. In case the selected PV input has been limited previously, this may mean an additional limitation of the selected PV input.

FIG. 8 shows a power-over-time diagram with the PV power of the two PV modules PV1, PV2. The horizontal axis designates time and the vertical axis designates the power in steps of 2000 Watt starting with 0 Watt. Line 42.1 shows the PV power $P_{PV1}$ of PV module PV1 and line 42.2 shows the PV power $P_{PV2}$ of PV module PV2. As can be seen from FIG. 8, PV module PV1 reaches a maximum PV power of about 8000 Watt and PV module PV2 reaches a maximum PV power of about 9000 Watt.

The input power limitation at PV input 3.1 is done on the basis of the last measured output power $P_{PV2in}$ of PV module PV2 at PV input 3.2 and the previously calculated maximum PV input power $P_{max}$ of the solar power inverter 7 according to the formula $$P_{PV1}[n]=\{\text{MIN}(P_{PV1}[n],P_{max}-P_{PV2in}\}.$$

And the input power limitation at PV input 3.2 is done on the basis of the last measured output power $P_{PV1in}$ of PV module PV1 at PV input 3.1 and the previously calculated maximum PV input power $P_{max}$ of the solar power inverter 7 according to the formula $$P_{PV2}[n]=\text{MIN}\{P_{PV2}[n],P_{max}-P_{PV1in}\}.$$

The power limitation according to these formulas is clone during the steps PV limitation 33.1, 33.2 as shown in the flow diagram of FIG. 7.

Figure 9:
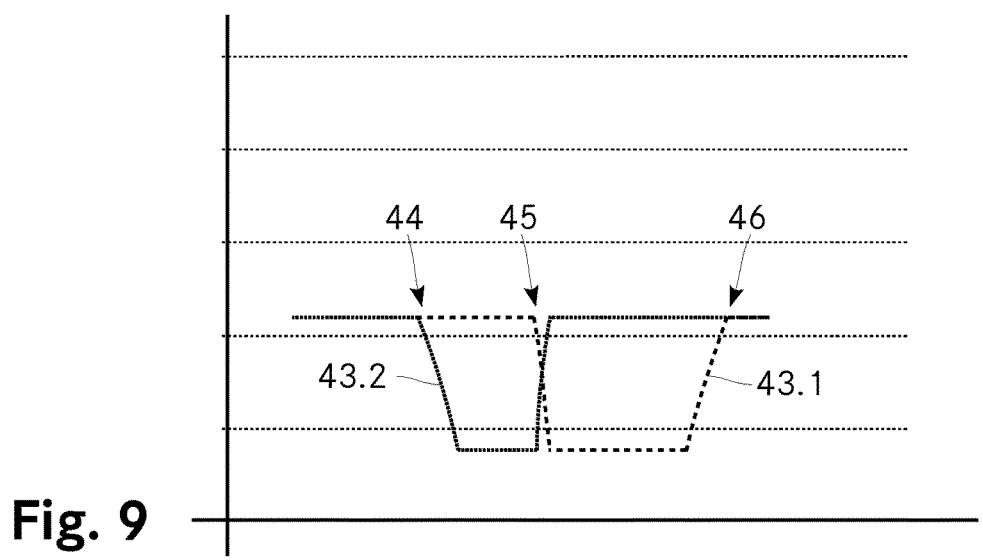

FIG. 9 shows a power-over-time diagram with the same axes as in FIG. 8. Line 43.1 shows the limited power at PV input 3.1 of the PV module PV1, i. e. the maximum allowed input power $PV1_{max\_in}$ And line 43.2 shows the limited power at PV input 3.2 of the PV module PV2, i. e. the maximum allowed input power $PV2_{max\_in}$. Accordingly, line 43.1 shows the development of the set value for PV module PV1 and line 43.2 shows the development of the set value for PV module PV2.

As can be seen from line 43.2, the maximum allowed input power $PV2_{max\_in}$ at PV input 3.2 is first limited from the maximum PV power $P_{PV2max}$ of 4500 Watt to about 1500 Watt at time 44. Line 43.1 shows that maximum allowed input power $PV1_{max\_in}$ at PV input 3.1 remains at the maximum PV power $P_{PV1max}$ of 4500 Watt.

Then, at time 45 the limitation is switched from PV input 3.2 to PV input 3.1. Line 43.1 is now limited from the maximum PV power $P_{PV1max}$ of 4500 Watt to about 1500 Watt and line 43.2 increases from 1500 Watt to the maximum PV power $P_{PV2max}$ of 4500 Watt.

Finally, at time 46, line 43.1 increases from 1500 Watt back to the maximum PV power $P_{PV1max}$ of 4500 Watt.

After the priority change from PV input 3.2 to PV input 3.1, the PV input power at PV input 3.2 increases back to the maximum PV power $P_{PV2max}$. This is done via a ramp from 1% increments of $P_{PV2max}$ according to the formula $$P_{PV2}[n]=\text{MIN}\{P_{PV2max},P_{PV2}[n-1]+(P_{PV2max}*1\%)\}.$$

Figure 10:
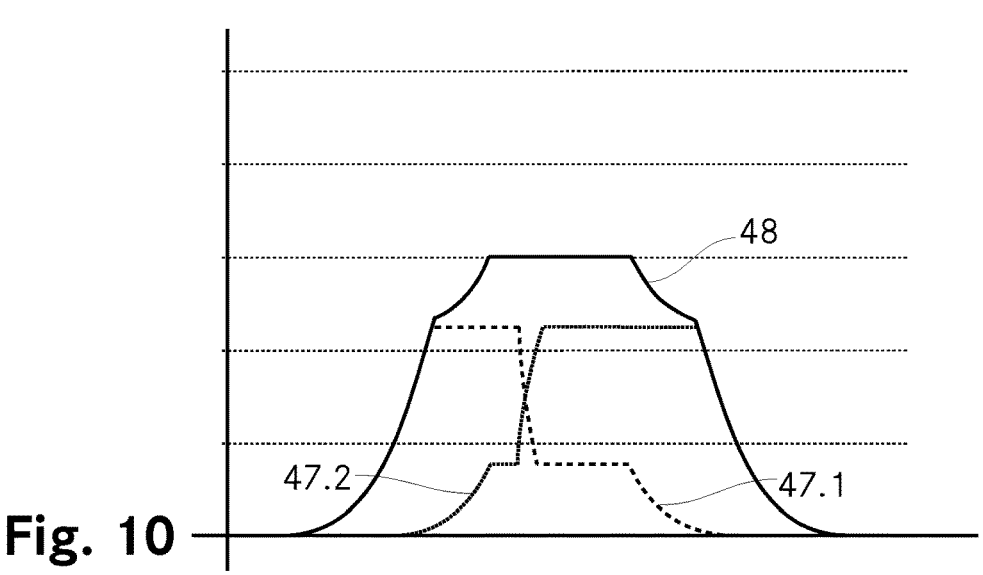

FIG. 10 shows a power-over-time diagram with the same axes as in FIGS. 8 and 9. Line 47.1 shows the resulting input power $PV1_{IN}$ at PV input 3.1 provided by PV module PV1 limited as shown by line 43.1 in FIG. 9. And line 47.2 shows the resulting input power $PV2_{IN}$ at PV input 3.2 provided by PV module PV2 limited as shown by line 43.2 in FIG. 9.

Accordingly, line 48 shows the development of the total resulting input power $PV_{IN}$ at the input of DC-AC inverter 7, which is the sum of the resulting input powers at PV inputs 3.1 and 3.2.

In summary, it is to be noted that the invention enables a simple way to increase the efficiency of a PV system by first identifying one or more PV inputs of a solar power inverter and then slightly limiting the input power at the identified PV inputs.

The invention claimed is:

1. A method of controlling a solar power inverter having two or more photovoltaic inputs for connecting photovoltaic modules, a DC-DC converter at each of the photovoltaic inputs and a DC-AC inverter for converting the outputs of the DC-DC converters to an AC output power to be outputted at an output of the solar power inverter, the method including the steps of calculating and applying a set value for an input power of the DC-DC converter at one of the photovoltaic inputs, characterised by the steps of identifying a photovoltaic input by assigning a priority value to at least a part of the photovoltaic inputs and identifying the photovoltaic input with the highest assigned priority value, calculating the set value for the DC-DC converter at the identified photovoltaic input to be equal or below a maximum power capacity of the photovoltaic module connected to the identified photovoltaic input and applying the set value for the DC-DC converter at the identified photovoltaic input, wherein the priority values are assigned to the photovoltaic inputs in two or more stages such that in each stage the priority values of two photovoltaic inputs are compared and the photovoltaic input with the higher priority is chosen to be the identified PV input or advances to the next stage to be compared with one of the remaining photovoltaic inputs.

2. The method according to claim 1, wherein assigning a priority value to at least a part of the photovoltaic inputs includes a step of obtaining a module value representative of a characteristic of the respective photovoltaic module connected to said photovoltaic inputs and determining the priority value under consideration of the obtained module values.

3. The method according to claim 2, wherein an output voltage of the photovoltaic modules is measured and wherein a priority value is assigned to the PV inputs each PV module such that a PV module having a lower output voltage is assigned a higher priority value than a PV module having a higher output voltage.

4. The method according to claim 2, wherein a temperature of the PV inputs is measured and wherein a priority value is assigned to each PV module such that a PV module connected to a PV input having a higher temperature is assigned a higher priority value than a PV module connected to a PV input having a lower temperature.

5. The method according to claim 2, wherein a run-time of all PV modules connected to the PV inputs is acquired and wherein a priority value is assigned to each PV module such that a PV module having a longer run-time is assigned a higher priority value than a PV module having a shorter run-time.

6. The method according to claim 1, herein the set value is calculated and applied repeatedly.

7. The method according to claim 1 wherein two or more photovoltaic inputs are identified and a set value for the input power of the DC-DC converters connected to the identified photovoltaic inputs are calculated and applied in an order of their priority values.

8. The method according to claim 1, wherein the set value for the input power of all DC-DC converters are set such that a sum of these input powers is equal to or below a maximum output power of the solar power inverter.

9. The method according to claim 1, wherein during a transition from one identified photovoltaic input to another identified photovoltaic input, a power of the solar power inverter is allowed to exceed a maximum output power of the solar power inverter.

10. The method according to claim 9, wherein the power of the solar power inverter may exceed the maximum output power of the solar power inverter by a defined percentage of the maximum output power, where the defined percentage is less than 3%.

11. The method according to claim 1, wherein, after a change from one photovoltaic input to another photovoltaic input, the input power of at least one of the photovoltaic inputs is increased to a maximum photovoltaic input power.

12. The method according to claim 1, wherein the set value for the DC-DC converter at the identified photovoltaic input number N at step n is designated as $P_{PVN[n]}$ and calculated according to the following formula $$P_{PVN}[n]=\mathrm{MIN}\{P_{PVN}[n], P_{max}-\mathrm{SUM}(P_{PVXin})\}$$

where $P_{max}$ is the maximum photovoltaic input power of the solar power inverter and $\mathrm{SUM}(P_{PVXin})$ is a sum of the measured photovoltaic input powers of all photovoltaic modules connected to the remaining PV inputs.

13. A solar power inverter having two or more photovoltaic inputs, a DC-DC converter at each of the photovoltaic inputs and a DC-AC inverter for converting the outputs of the DC-DC converters to an AC output power to be outputted at an output of the solar power inverter, characterised in that the solar power inverter includes a control device for calculating and applying a set value for an input power of the DC-DC converter at one of the photovoltaic inputs, wherein the control device is further adapted to
identify a photovoltaic input by assigning a priority value to at least a part of the photovoltaic inputs and identifying the photovoltaic input with the highest assigned priority value,
calculate the set value for the DC-DC converter at the identified photovoltaic input to be equal or below a maximum power capacity of a photovoltaic module connected to the identified photovoltaic input
and applying the set value to the DC-DC converter at the identified photovoltaic input
wherein the control device is further adapted to assign the priority values to the photovoltaic inputs in two or more stages such that in each stage the priority values of two photovoltaic inputs are compared and the photovoltaic input with the higher priority is chosen to be the identified PV input or advances to the next stage to be compared with one of the remaining photovoltaic inputs.

14. The method according to claim 6, wherein the set value is calculated and applied in regular time intervals between 5 seconds and 10 minutes.

15. The method according to claim 10, wherein the defined percentage is 1% or less.

16. The method according to claim 11, wherein the input power of at least one of the photovoltaic inputs is increased to a maximum photovoltaic input power in regular steps of 1% of a maximum photovoltaic input power $P_{PVNmax}$ of PV input number N according to the following formula $$P_{PVN}[n]=\mathrm{MIN}\{P_{PVNmax}, P_{PVN}[n-1]+(P_{PVNmax}*1\%)\}$$

where $P_{PVN[n]}$ is the calculated set value for the input power at the PV input Number N at step n and $P_{PVN[n]}$ is the calculated set value for the input power at the PV input number N at step n−1.

* * * * *